(12) United States Patent
Vanags et al.

(10) Patent No.: US 9,361,071 B2
(45) Date of Patent: Jun. 7, 2016

(54) IMPLICIT PARAMETERS AND IMPLICIT ARGUMENTS IN PROGRAMMING LANGUAGES

(71) Applicants: Mikus Vanags, Riga (LV); Janis Justs, Riga (LV); Didzis Romanovskis, Riga (LV)

(72) Inventors: Mikus Vanags, Riga (LV); Janis Justs, Riga (LV); Didzis Romanovskis, Riga (LV)

(73) Assignee: Logics Research Centre, Riga (LV)

( * ) Notice: Subject to any disclaimer, the term of this patent is extended or adjusted under 35 U.S.C. 154(b) by 30 days.

(21) Appl. No.: 14/081,460

(22) Filed: Nov. 15, 2013

(65) Prior Publication Data

US 2015/0143330 A1 May 21, 2015

(51) Int. Cl.
G06F 9/44 (2006.01)
G06F 9/45 (2006.01)

(52) U.S. Cl.
CPC .......................................... *G06F 8/31* (2013.01)

(58) Field of Classification Search
USPC .......................................................... 717/114
See application file for complete search history.

(56) References Cited

U.S. PATENT DOCUMENTS

| | | | | |
|---|---|---|---|---|
| 5,500,881 A * | 3/1996 | Levin | | G06F 8/71 717/114 |
| 5,696,973 A * | 12/1997 | Agrawal et al. | | 717/154 |
| 5,696,974 A * | 12/1997 | Agrawal et al. | | 717/152 |
| 6,981,250 B1 * | 12/2005 | Wiltamuth et al. | | 717/170 |
| 7,636,914 B1 * | 12/2009 | Johnson | | 717/143 |
| 7,774,376 B1 * | 8/2010 | Meijer et al. | | 707/802 |
| 7,873,958 B2 * | 1/2011 | Wiltamuth et al. | | 717/170 |
| 7,971,194 B1 * | 6/2011 | Gilboa | | 717/136 |
| 8,627,282 B1 * | 1/2014 | Karr | | 717/114 |
| 8,656,365 B2 * | 2/2014 | Rama et al. | | 717/126 |
| 8,739,137 B2 * | 5/2014 | Siskind et al. | | 717/136 |
| 8,949,805 B2 * | 2/2015 | Dolinsky et al. | | 717/149 |
| 2006/0026568 A1 * | 2/2006 | Wiltamuth et al. | | 717/122 |
| 2006/0048095 A1 * | 3/2006 | Meijer et al. | | 717/114 |
| 2007/0044083 A1 * | 2/2007 | Meijer et al. | | 717/151 |
| 2007/0142929 A1 | 6/2007 | Pereira | | |
| 2008/0262992 A1 * | 10/2008 | Meijer | | G06F 9/4428 706/52 |
| 2012/0110559 A1 * | 5/2012 | Dolinsky et al. | | 717/143 |
| 2013/0061211 A1 * | 3/2013 | Rama et al. | | 717/126 |
| 2014/0068557 A1 * | 3/2014 | Vanags | | G06F 8/315 717/116 |
| 2014/0068574 A1 * | 3/2014 | Naden et al. | | 717/140 |
| 2014/0082014 A1 * | 3/2014 | Vanags et al. | | 707/769 |
| 2014/0173573 A1 * | 6/2014 | Chase | | 717/140 |
| 2015/0143330 A1 * | 5/2015 | Vanags | | G06F 8/31 717/114 |

OTHER PUBLICATIONS

Mayo et al. "Forced naming of parameters in python" published on Jun. 3, 2010 to Jul. 30, 2013, retrieved from <http://stackoverflow.com/questions/2965271/forced-naming-of-parameters-in-python> total p. 5.*

(Continued)

*Primary Examiner* — Marina Lee

(57) ABSTRACT

An embodiment of the present invention consists of methods for parameter declaration in implicit way and of methods for argument usage in implicit way. An embodiment of the present invention is useful in programming languages which support at least one concept that can be interpreted as a method. This invention: raises code readability; reduces redundancy of parameter name and parameter type information making specific parts of the programming language code more compact; allows reduction of global variables making code more parallelizable and suitable for parallel computing systems.

18 Claims, 14 Drawing Sheets

```
/* implicitly defined method parameters are ordered in a list of method parameters
according to the parameter occurrence in the method body. First met implicitly defined
```

(56) References Cited

OTHER PUBLICATIONS

Lewis et al., "Implicit Parameters: Dynamic Scoping with Static Types", ACM New York, NY, USA © 2000, pp. 108-118.*
Microsoft Corporation: C# Language Specification Version 5.0. (1999-2012).
Jon Skeet: C# in Depth Third Edition, Manning, Stamford (2013).
Scala language documentation (2014).
SaltyCrane: How to use *args and **kwargs in Python (2008).
J. Gosling, B. Joy, G. Steele, G. Bracha, and A. Buskley. The Java® Language Specification java se 8 edition, 2015.
B. Goetz . Language / Library / VM co-evolution in Java SE 8, Oracle Corporation, 2011.
JetBrains®. Kotlin language reference, 2015.
A. Breslav, D. Jemerov. JetBrains. The Kotlin Programming Language, 2011.
Apple Inc. The swift programming language, 2015.

* cited by examiner

FIG. 1 -Prior Art-

```
//example of method overloading
void DoSomething() {}
void DoSomething(double a){}
void DoSomething(string a){}
```

FIG. 2 -Prior Art-

```
//program entry point
static void Main()
{
    PrintName(string.Empty);
    PrintName("Ginta");
}
static void PrintName(string name)
{
    if (name == string.Empty)
    {
        Console.WriteLine("Anonymous");
    }
    else
    {
        Console.WriteLine(name);
    }
}
```

FIG. 3 -Prior Art-

```
static void Main()
{
    PrintName();
    PrintName("Ginta");
}
static void PrintName()
{
    //provide default argument
    PrintName("Anonymous");
}
static void PrintName(string value)
{
    Console.WriteLine(value);
}
```

FIG. 4 -Prior Art-

```
/* The first parameter has no default value assigned to it. Therefore, it is required.
Both optionalString and optionalInteger have default values assigned to them. They are
optional. */
void DoSomething1(int required,
    string optionalString = "default string", int optionalInteger = 10)
{
    Console.WriteLine(
        "required={0}; optionalString={1}; optionalInteger={2};",
        required, optionalString, optionalInteger);
}
```

FIG. 5 -Prior Art-

```
DoSomething1(1, "One", 1);
DoSomething1(2, "Two");
DoSomething1(3);
```

FIG. 6 -Prior Art-

```
required=1; optionalString=One; optionalInteger=1;
required=2; optionalString=Two; optionalInteger=10;
required=3; optionalString=default string; optionalInteger=10;
```

FIG. 7 -Prior Art-

```
DoSomething1(3, 3); /* second argument expected to be of type string */
```

FIG. 8 -Prior Art-

```
required=3; optionalString=default string; optionalInteger=3;
```

FIG. 9 -Prior Art-

```
//parameter passing by value
static void AddSix(int i)
{
    i = i + 6; //value i is not used in any execution path
}
//parameter passing by reference
static void AddSix(ref int i)
{
    i = i + 6;
}
//method with parameter passed by value and output parameter
static void AddSix(int i, out int result)
{
    result = i + 6;
}
static void Main()
{
    int arg;

// Argument passing by value. The value of arg in Main is not changed.
    arg = 3;
    AddSix(arg);
    Console.WriteLine(arg); // Output: 3

// Argument passing by reference. The value of arg in Main is changed.
    arg = 3;
    AddSix(ref arg);
    Console.WriteLine(arg); // Output: 9

// Output parameter. The value of arg in Main is changed.
    AddSix(1, out arg);
    Console.WriteLine(arg); // Output: 7
}
```

FIG. 10 -Prior Art-

```
scala> def speakImplicitly (implicit greeting : String) = println(greeting)
speakImplicitly: (implicit greeting: String)Unit scala> speakImplicitly("Goodbye world")
Goodbye world scala> speakImplicitly
error: could not find implicit value for parameter greeting: String scala> implicit val hello = "Hello world"
hello: String = Hello world scala> speakImplicitly
Hello world
```

FIG. 11 -Prior Art-

```
scala> def speakImplicitly (implicit greeting : String) = println(greeting)
speakImplicitly: (implicit greeting: String)Unit scala> implicit val param1 = "hello";
param1: String = hello scala> implicit val param2 = "world";
param2: String = world scala> speakImplicitly
error: ambiguous implicit values:
  both value param1 of type => String
  and value param2 of type => String
  match epected type String
```

FIG. 12 -Prior Art-

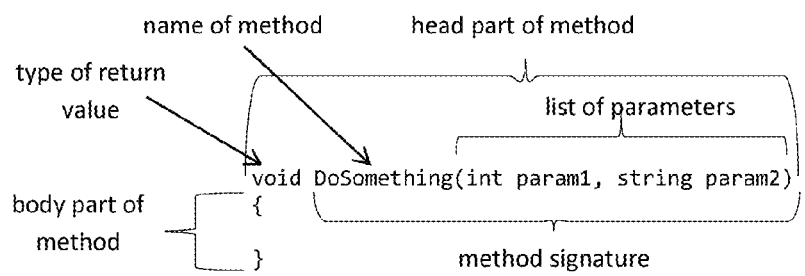

FIG. 13

```
//parameter param1 defined implicitly
void DoSomething2()
{
    int x = int param1;
    Console.WriteLine(x);
}
```

FIG. 14 -Prior Art-

```
void DoSomething2(int param1)
{
    int x = param1;
    Console.WriteLine(x);
}
```

FIG. 15 -Prior Art-

```
//argument required when calling
DoSomething2(6);
```

FIG. 16

/* implicitly defined method parameters are ordered in a list of method parameters
according to the parameter occurrence in the method body. First met implicitly defined

```
parameter in the method body comes first in the list of method parameters right after
non-implicit parameters.*/
void DoSomething3()
{
    int x = int param1;
    int y = int param2;
    string s = string param3;
    MyClass z = MyClass param4;
}
```

FIG. 17 -Prior Art-

```
void DoSomething3 (int param1, int param2, string param3, MyClass param4)
{
    int x = param1;
    int y = param2;
    string s = param3;
    MyClass z = param4;
}
```

FIG. 18 -Prior Art-

```
//arguments required when calling
DoSomething3 (6, 23, "text", null);
```

FIG. 19

```
//first parameter is used more than once in the method body
void DoSomething4()
{
    int x = int param1;
    int y = param1; //y == x; parameter type needs to be declared only once
    int z = int param2;
}
```

FIG. 20 -Prior Art-

```
void DoSomething4(int param1, int param2)
{
    int x = param1;
    int y = param1; //y is equal to x
    int z = param2;
}
```

FIG. 21

```
void DoSomething5()
{
    int x = int param1;
}
void DoSomething6()
{
    DoSomething5(int param1); //implicit parameter declared in method call
}
```

FIG. 22 -Prior Art-

```
void DoSomething5(int param1)
{
    var x = param1;
}
void DoSomething6(int param1)
{
    DoSomething5(param1);
}
```

FIG. 23

```
//using anonymous implicitly defined parameters
void DoSomething7()
{
    int x = int param1;
    int y = param1; //y == x
    int z = int; //anonymous implicit parameter
}
```

FIG. 24 -Prior Art-

```
void DoSomething7(int param1, int autoGeneratedParamName1)
{
    int x = param1;
    int y = param1; //y == x
    int z = autoGeneratedParamName1;
}
```

FIG. 25

```
void DoSomething8()
{
    int x = int;
    int y = int;
    string s = string;
    MyClass z = MyClass;
}
```

FIG. 26 -Prior Art-

```
void DoSomething8 (int autoGeneratedParamName1, int autoGeneratedParamName2, string
autoGeneratedParamName3, MyClass autoGeneratedParamName4)
{
    int x = autoGeneratedParamName1;
    int y = autoGeneratedParamName2;
    string s = autoGeneratedParamName3;
    MyClass z = autoGeneratedParamName4;
}
```

FIG. 27

```
void DoSomething9()
{
    int x = int param1;
}
void DoSomething10()
{
    DoSomething9(int); //anonymous implicit parameter declared in method call
}
```

FIG. 28 -Prior Art-

```
void DoSomething9(int param1)
{
    var x = param1;
}
void DoSomething10(int autoGeneratedParamName1)
{
    DoSomething9(autoGeneratedParamName1);
}
```

FIG. 29

```
void DoSomething11()
{
    //canonical syntactic form of implicit parameter declaration
    int x = param1;
}
```

FIG. 30 -Prior Art-

```
void DoSomething11(int param1)
{
    var x = param1;
}
```

FIG. 31

```
void DoSomething12()
{
    //invalid example, because type of variable x is unknown
    var x = param1;
}
```

FIG. 32

```
void DoSomethingWithX(int x) { }
void DoSomething13()
{
    //canonical syntactic form of implicit parameter declaration
    DoSomethingWithX(param1);
}
```

FIG. 33 -Prior Art-

```
void DoSomething13(int param1)
{
    DoSomethingWithX(param1);
}
```

FIG. 34

```
//using anonymous implicitly defined parameter passed by reference
void DoSomething14()
{
    ref param1 = 6; //implicitly defined reference parameter
}
```

FIG. 35 -Prior Art-

```
//method contains one parameter passed by reference
void DoSomething14(ref int param1)
{
    param1 = 6;
}
```

FIG. 36

```
//using anonymous implicitly defined output parameter
void DoSomething15()
{
    out param1 = 6; //anonymous implicit parameter
}
```

FIG. 37 -Prior Art-

```
//method contains one output parameter
void DoSomething15(out int param1)
{
    param1 = 6; //assigning value to output parameter
}
```

FIG. 38 -Prior Art-

```
//output parameter example without value assigned to it
void DoSomething16(out int param1)
{

```
void PrintName(string firstName, string lastName)
{
    Console.WriteLine(lastName);
    Console.WriteLine(firstName);
}
```

FIG. 40 -Prior Art-

```
void DoNothingWith(params object[] param) { }
void PrintName()
{
    DoNothingWith(string firstName);
    Console.WriteLine(string lastName);
    Console.WriteLine(firstName);
}
```

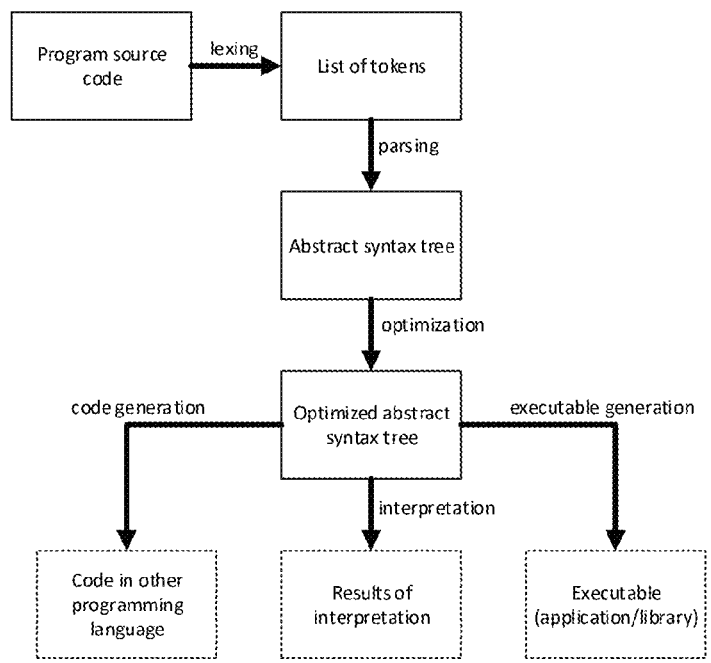

```
void PrintName()
{
    place(string firstName);
    Console.WriteLine(string lastName);
    Console.WriteLine(firstName);
}
```

FIG. 43

```
void DoSomething17(int param1)
{
    int x = param1;
    int y = int param2;
}
void DoSomething18()
{
    DoSomething17();//param1, param2 added to list of DoSomething18 parameters
}
void DoSomething19(int paramA, int paramB)
{
    /*this call syntax still can be improved if we change
    parameter names paramA and paramBm to param1 and param2*/
    DoSomething18(paramA, paramB);
}
```

FIG. 44 -Prior Art-
```
void DoSomething17(int param1, int param2)
{
    var x = param1;
    var y = param2;
}
void DoSomething18(int param1, int param2)
{
    DoSomething17(param1, param2);
}
void DoSomething19(int paramA, int paramB)
{
    DoSomething18(paramA, paramB);
}
```

FIG. 45
```
void DoSomething20(int param1)
{
    int x = param1;
    int y = int param2;
}
void DoSomething21()
{
    //arguments detected and added to list of DoSomething21 parameters
    DoSomething20();
}
//in final method chain fragment parameters can be declared in method head
void DoSomething22(int param1, int param2)
{
    /*if method parameter names are the same as used in DoSomething21
    method call chain, then DoSomething21 arguments can be omitted,
    they can be detected from context automatically*/
    DoSomething21();
}
```

FIG. 46
```
/*method contains two implicit parameters: int param1 and int param2
void DoSomething22()
{
    /*DoSomething21 arguments added to DoSomething22 list of parameters*/
    DoSomething21();
}
```

FIG. 47 -Prior Art-

```
void DoSomething20(int param1, int param2)
{
    var x = param1;
    var y = param2;
}
void DoSomething21(int param1, int param2)
{
    DoSomething20(param1, param2);
}
void DoSomething22(int param1, int param2)
{
    DoSomething21(param1, param2);
}
```

FIG. 48

```
void DoSomething23()
{
    int x = int param1;
    int y = int param2;
}
void DoSomething24()
{
    int x = int param1;
    float y = int param2;
}
void DoSomething25()
{
    DoSomething23();
    DoSomething24();
}
```

FIG. 49 -Prior Art-

```
void DoSomething23(int param1, int param2)
{
    var x = param1;
    var y = param2;
}
void DoSomething24(int param1, float param2)
{
    var x = param1;
    var y = param2;
}
//this method passes param1 as DoSomething23 and DoSomething24 first
//argument, but in case of param2 there is a parameter naming conflict
void DoSomething25(int param1, int param2, float param2)
{
    DoSomething23(param1, param2);
    DoSomething24(param1, param2);
}
```

FIG. 50

```
void DoSomething25()
{
    DoSomething23(int param1, int param2);
    //Here param1 is reused. If it is not desired effect,
    //then it should be corrected with another implicit parameter
    DoSomething24(param1, float param3);
}
```

FIG. 51 -Prior Art-

```
void DoSomething25(int param1, int param2, float param3)
{
    DoSomething23(param1, param2);
    DoSomething24(param1, param3);
}
```

FIG. 52

```
// method contains parameters with modifiers: ref, out and params
void DoSomething26(ref int param1, out int param2, params int[] param3)
{
    param1 = param1 + 6;
    param2 = 6;
}
// implicit parameters: param1, param2, param3
void DoSomething27()
{
    DoSomething26(); //implicit arguments: param1, param2, param3
}
```

FIG. 53 -Prior Art-

```
// method contains one parameter passed by reference
void DoSomething27(ref int param1, out int param2, params int[] param3)
{
    DoSomething26(ref param1, out param2, param3);
}
```

FIG. 54

```
void DoSomething28<T>(T param1)
{
    var x = param1;
    var y = T param2;
}
```

FIG. 55 -Prior Art-

```
void DoSomething28<T>(T param1, T param2)
{
    T x = param1;
    T y = param2;
}
```

FIG. 56 -Prior Art-

```
//calling method
DoSomething28<int>(6, 36);

//calling method and taking advantage of type inference
DoSomething28(6, 36);
```

FIG. 57

```
void DoSomething29<T>(T param1)
{
    var x = param1;
    var y = T param2;
}
void DoSomething30()
{
    //arguments detected from usage context and added to parameters list
    //generic parameter is also detected from usage context
    DoSomething29();
}
//in final method chain fragment generic parameters and
//parameters should be declared as normally
void DoSomething31<T>(T param1, T param2)
{
    /*if method parameter names are the same as used in DoSomething30
    method call chain, then DoSomething30 arguments can be omitted,
    they will be detected automatically from the context. Generic parameter
    T type can be detected using type inference from 'param1' and 'param2'*/
    DoSomething30();
}
```

FIG. 58 -Prior Art-

```
//without using implicit parameters:
void DoSomething29<T>(T param1, T param2)
{
    T x = param1;
    T y = param2;
}
void DoSomething30<T>(T param1, T param2)
{
    DoSomething29(param1, param2);
}
void DoSomething31<T>(T param1, T param2)
{
    //generic parameter detected using type inference
    DoSomething30(param1, param2);
}
```

FIG. 59

```
metaset i as Invoice;
atWarehouse(i) :- i.Warehouse == storage;
inPeriod(i) :- i.DealDate >= startDate, i.DealDate < endDate;
buyingAtWarehouseInPeriod(i) :- atWarehouse(i), inPeriod(i);
```

FIG. 60

```
metaset i as Invoice;
atWarehouse(i1) :- i1.Warehouse == storage;
inPeriod(i2) :- i2.DealDate >= startDate, i2.DealDate < endDate;
buyingAtWarehouseInPeriod(i3) :- atWarehouse(i3), inPeriod(i3);
```

FIG. 61

```
//metaset declarations
metaset i as Invoice;

//global variable declarations
value storage as Warehouse;
value startDate as DateTime;
value endDate as DateTime;

//rule declarations (global variables are used here):
atWarehouse(i) :- i.Warehouse == storage;
inPeriod(i) :- i.DealDate >= startDate, i.DealDate < endDate;
buyingAtWarehouseInPeriod(i) :- atWarehouse(i), inPeriod(i);

//query declaration (global variables are used here):
BuyingAtWarehouseInPeriod(companyWarehouse, startDate, endDate) =
    buyingAtWarehouseInPeriod(i)?
```

FIG. 62

```
//metaset declarations
metaset i as Invoice;

//rule declarations, implicit parameters: storage, startDate, endDate:
atWarehouse(i) :- i.Warehouse == storage;
inPeriod(i) :- i.DealDate >= startDate, i.DealDate < endDate;
//implicit arguments: storage, startDate, endDate:
buyingAtWarehouseInPeriod(i) :- atWarehouse(i), inPeriod(i);

//query (question) declaration; implicit arguments: storage, startDate, endDate
//query declaration does not use implicit parameters to raise readability
BuyingAtWarehouseInPeriod(Warehouse storage, DateTime startDate, DateTime endDate)
    = buyingAtWarehouseInPeriod(i)?
```

IMPLICIT PARAMETERS AND IMPLICIT ARGUMENTS IN PROGRAMMING LANGUAGES

REFERENCES CITED

U.S. Patent Documents 1. 2007/0142929 A1 June 2007 Pereira.

Other Sources 2. 2. C# language specification version 5.0, Microsoft Corporation.
3. Jon Skeet: C# in Depth, Third Edition, Manning (2013).
4. 4. Scala language documentation.

BRIEF DESCRIPTION OF DRAWINGS

The system and methods for providing implicit parameters and implicit arguments usage are further described with a reference to the accompanying drawings in which:

FIG. 1. shows method overloading example.

FIG. 2. shows an example, where using conditional operator some code branches may become unnecessary.

FIG. 3. shows method overloading example, which reduces unnecessary code branching problem.

FIG. 4. shows optional argument (parameter default value) declaration example.

FIG. 5. shows method (shown in FIG. 4.) calling examples.

FIG. 6. shows results of method calling examples shown in FIG. 5.

FIG. 7. shows invalid method (declared in FIG. 4.) calling example.

FIG. 8. shows results of method (declared in FIG. 4.) calling example, where first and third arguments are provided and the third argument is named argument.

FIG. 9. shows example of parameter passed by value, parameter passed by reference and output parameter.

FIG. 10. shows Scala implicit parameter example.

FIG. 11. shows invalid Scala implicit parameter example, when trying to declare multiple Scala implicit parameters of the same type.

FIG. 12. shows example method declared in the C# programming language demonstrating interpretation of the different parts of method.

FIG. 13. shows simple example of implicit parameter declaration.

FIG. 14. shows method DoSomething2 (defined in FIG. 13.) rewritten without using implicit parameters.

FIG. 15. shows execution example of DoSomething2 (defined in FIG. 13. with an alternative example defined in FIG. 14.).

FIG. 16. shows example with several parameters defined implicitly.

FIG. 17. shows method DoSomething3 (defined in FIG. 16.) rewritten without using implicit parameters.

FIG. 18. shows execution example of method DoSomething3 (defined in FIG. 16. and alternative example defined in FIG. 17.).

FIG. 19. shows how to reuse implicit parameter in the method body.

FIG. 20. shows method DoSomething4 (defined in FIG. 20.) rewritten without using implicit parameters.

FIG. 21. shows example of implicit parameter declaration as a part of method call statement-expression.

FIG. 22. shows methods DoSomething5 and DoSomething6 (defined in FIG. 21.) rewritten without using implicit parameters.

FIG. 23. shows example of anonymous implicit parameter.

FIG. 24. shows method DoSomething7 (defined in FIG. 23.) rewritten without using implicit parameters.

FIG. 25. shows usage of many anonymous implicit parameters in one method.

FIG. 26. shows method DoSomething8 (defined in FIG. 25.) rewritten without using implicit parameters.

FIG. 27. shows anonymous implicit parameter declaration as a part of method call expression.

FIG. 28. shows methods DoSomething9 and DoSomething10 (defined in FIG. 27.) rewritten without using implicit parameters.

FIG. 29. shows example of implicit parameter declaration by using canonical declaration form in assignment statement-expression.

FIG. 30. shows method DoSomething11 (defined in FIG. 29.) rewritten without using implicit parameters.

FIG. 31. shows invalid example of implicit parameter declaration in canonical form. Type of variable x cannot be detected from usage context.

FIG. 32. shows canonical form of implicit parameter declaration as a part of method call statement-expression.

FIG. 33. shows method DoSomething13 (defined in FIG. 32.) rewritten without using implicit parameters.

FIG. 34. shows implicitly defined parameter in canonical form, passed by reference.

FIG. 35. shows method DoSomething14 (defined in FIG. 34.) rewritten without using implicit parameters.

FIG. 36. shows implicitly defined output parameter in canonical form.

FIG. 37. shows method DoSomething15 (defined in FIG. 36.) rewritten without using implicit parameters.

FIG. 38. shows invalid example of method declaration containing output parameter.

FIG. 39. shows example, when first parameter from the list of method parameters is not used first in algorithm defined in method body. Method is defined without using implicit parameters.

FIG. 40. shows method PrintName (defined in FIG. 39.) rewritten using implicit parameters and using method DoNothingWith to affect order of implicit parameters in a list of method parameters (method signature).

FIG. 41. shows different phases used to process program source code.

FIG. 42. shows method PrintName (defined in FIG. 39.) rewritten using implicit parameters and operator "place".

FIG. 43. shows example of implicit arguments.

FIG. 44. shows methods DoSomething17, DoSomething18 and DoSomething19 (defined in FIG. 43.) rewritten without using implicit arguments.

FIG. 45. shows how call syntax inside method DoSomething19 (FIG. 43.) declaration still can be improved if we change DoSomething19 parameter names paramA and paramB, using the names param1 and param2.

FIG. 46. shows DoSomething22 (declared in FIG. 45.), but using implicit arguments in DoSomething21 call and implicit parameters in DoSomething22 declaration itself.

FIG. 47. shows methods DoSomething20, DoSomething21 and DoSomething22 (defined in FIG. 45.) rewritten without using implicit arguments.

FIG. 48. shows example of implicit arguments naming conflict.

FIG. 49. shows methods DoSomething23, DoSomething24 and DoSomething25 (defined in FIG. 48.) rewritten without using implicit arguments.

FIG. 50. shows example of resolved implicit arguments naming conflict (introduced in FIG. 48.).

FIG. 51. shows methods DoSomething25 (defined in FIG. 50.) rewritten without using implicit arguments.

FIG. 52. shows example of implicit argument passed by reference, implicit output argument and implicit argument with method parameter modifier params.

FIG. 53. shows method DoSomething27 (defined in FIG. 52.) rewritten without using implicit arguments.

FIG. 54. shows example how implicit parameters and arguments can be used together with generics.

FIG. 55. shows method DoSomething28 (defined in FIG. 54.) rewritten without using implicit parameters and arguments.

FIG. 56. shows method DoSomething28 (defined in FIG. 54. and alternative defined in FIG. 55.) execution examples.

FIG. 57. shows example how generics can be used in method chains together with implicit parameters and implicit arguments.

FIG. 58. shows methods DoSomething29, DoSomething30 and DoSomething31 (defined in FIG. 57.) rewritten without using implicit parameters and arguments.

FIG. 59. shows object set abstraction (meta-set) declaration and usage syntax.

FIG. 60. shows how compiler would interpret example demonstrated in FIG. 59.

FIG. 61. shows example in data querying language based on Prolog without using implicit parameters and arguments.

FIG. 62. shows example in data querying language based on Prolog using implicit parameters and arguments.

BACKGROUND

The method overloading allows creating several methods with the same name, which differ from each other in the type of the input of the method. It is simply defined as the ability of one method to perform different tasks. Compiler identifies which of the overloaded methods to execute based on a number of arguments and their data types during compilation itself.

Pseudo code is used in all examples provided in this work. Pseudo code is based on the general purpose language C# [2] including implicit parameter and argument extension features.

The method overloading examples are shown in FIG. 1. When designing complex programs, the code changes and some branches may become unnecessary as shown in FIG. 2. In such cases overloaded methods can improve code readability as shown in FIG. 3., because they provide more static information during the compile-time and they typically result in a better runtime performance.

This works fine for a single parameter, but some problems might occur, when there are multiple options. Each extra option doubles the number of possible overloads; and if two of them are of the same type, problems can arise due to trying to declare multiple methods with the same signature. Number of possible overloads could be significantly reduced with optional arguments[1]. [1, 2, 3]

[1] Sometimes arguments are called: actual parameters.

Optional arguments are usually used when there are several values required for an operation, where the same values are used multiple times. Optional argument declaration example is shown in FIG. 4, method calling examples are provided in FIG. 5, which produces output shown in FIG. 6.

When supplying unnamed arguments, their order should match the order of parameters in the method declaration, it is not possible to supply first and third argument omitting second argument. The code shown in FIG. 7. is invalid. This problem can be solved by using named arguments. [3]

The basic idea of named arguments is that specifying an argument value it is also possible to specify the name of the parameter, which will receive value of specified argument. The compiler then makes sure that there is a parameter of the right name and uses the value for that parameter. Even on its own, this can increase readability in some cases. In reality, named arguments are the most useful in cases, where optional arguments are also likely to appear.

An example with supplying first and third arguments to method DoSomething1 (FIG. 4) call is the following:

DoSomething1 (3, optionalInteger: 3);

Method call produces result shown in FIG. 8.

The named arguments and optional arguments affect how the compiler resolves overloads. Optional arguments can increase the number of applicable methods (if some methods have more parameters[2] than the number of specified arguments) and named arguments can decrease the number of applicable methods (by ruling out methods that do not have the appropriate parameter names).

[2] Sometimes parameters are called: formal parameters.

The parameter names of a method are effectively part of the API. If you change them at a later date, code can break—anything that was using a named argument to refer to one of your parameters will fail to compile if you decide to change it.

All previously reviewed methods are methods with the parameters and arguments passed by value. If a parameter is declared for a method without ref or out, the parameter can have a value associated with it. That value can be changed in the method, but the changed value will not be retained, when control passes back to the calling procedure. [2]

The ref keyword causes an argument to be passed by reference, not by value. The effect of passing by reference is that any change to the parameter in the method is reflected in the underlying argument variable in the calling method. The value of a reference parameter is always the same as the value of the underlying argument variable. [2]

A parameter declared with an 'out' modifier is an output parameter. Similar to a reference parameter, an output parameter does not create a new storage location. Instead, an output parameter represents the same storage location as the variable given as the argument in the method invocation. A variable does not need to be definitely assigned before it can be passed as an output parameter, but following an invocation where a variable was passed as an output parameter, the variable is considered definitely assigned. [2]

In FIG. 9. examples of parameter passed by value, parameter passed by reference and output parameter are demonstrated. A reference and output parameter cannot have a default value, so these parameters cannot be optional. The required arguments cannot be omitted in method calls.

The Scala language specification [4] (current version 2.8) supports the feature called "implicit parameters"[3], which is similar to optional arguments. Scala implicit parameters allow declaring the last parameter list of a function to be implicit. The syntax for this works as demonstrated in FIG. 10. (using Scala REPL[4]).

[3] Which in this paper are called "scala implicit parameters", because they are declared outside of the method declaration. Historically idea of parameters is related to a method. If parameters are declared outside of method, then they are not parameters of method by definition, they are variables of scope higher than scope of method instead.

[4] Read-eval-print loop.

It is possible to call speakImplicitly as normal but, additionally, we can leave out the implicit argument list and the compiler will look for a value in the enclosing scope, which has been marked as implicit. If we try to do that and there is no such value in scope, then the compiler will return error code.

Implicits are type safe and they are selected based on the static type of the arguments. This means that Scala implicit parameters allow implicit parameter reuse in the different functions. However, if there are multiple Scala implicit parameters of the same type, compiler will fail to use any, because it is not able to choose between them as demonstrated in FIG. 11.

All identified problems and limitations of the C# optional arguments and Scala implicit parameters can be solved with the implicit parameters and implicit arguments.

SUMMARY

An embodiment of the present invention provides methods for implicit parameter declaration and for implicit argument usage. Implicit parameters (formal parameters) and implicit arguments (actual parameters) can be used as: passed by value; passed by reference; output parameters; parameters that take a variable number of arguments; any form of parameters which does not require changes to implicit parameter/argument declaration syntax. Implicit parameters can be used in three different syntactic forms: full form—providing parameter name and type of the parameter; canonical form—providing only name of the parameter; anonymous parameter form—providing only type of the parameter.

An embodiment of the present invention is useful in programming languages, which support at least one concept that can be interpreted as a method. The invention raises code readability; reduces redundancy of the parameter name and parameter type information making specific parts of the programming language code more compact; allows reduction of global variables making code more parallelizable and suitable for parallel computing systems.

DETAILED DESCRIPTION

The implicit parameters operate by taking method parameters declaration from the method head part to the method body part (see FIG. 12.), where implicit parameter will be declared as an expression[5]. Implicit parameter declaration syntax:

[5] Something which evaluates to a value.

ParameterType parameterName where ParameterType specifies type of the parameter and parameterName specifies name of the parameter.

Implicit parameter declaration syntax is similar to the local variable declaration syntax:

local-variable-declarator identifier;

where local-variable-declarator specifies type of the local variable or keyword 'var'; and identifier specifies name of the local variable.

Local variables are declared as statements[6], but implicit parameters are declared as:
  (a) expressions of statements;
  (b) expressions of complex expressions.

[6] Code, which does something.

Local variable can be declared together with the initialization expression:

local-variable-declarator identifier=local-variable-initializer;

where local-variable-initializer is variable initialization expression.

Simple example of implicit parameter declaration in method DoSomething2, where implicit parameter is declared as a local-variable-initializer expression is shown in FIG. 13. Method DoSomething2 can be rewritten by using parameters declared in the method head part as shown in FIG. 14.

Type of formal parameters can be detected automatically from parameter declaration in the method body declaration. Method call information is not needed to detect type of the formal parameters.

Method DoSomething2 execution example is provided in FIG. 15.

In the method body, non-implicit parameters will be included in the list of method parameters first, followed by the implicitly defined parameters. If the method contains many implicit parameters, they are ordered in a list of method parameters according to their occurrence in the method body. The example shown in FIG. 16. demonstrates method DoSomething3 example with several parameters defined implicitly. Method DoSomething3 can be rewritten by using parameters declared in the method head part as shown in FIG. 17. Method DoSomething3 calling example is given in FIG. 18.

Method DoSomething4 shown in FIG. 19. demonstrates how to use implicit parameter in the method body more than once. Method DoSomething4 can be rewritten by using parameters declared in the method head part as shown if FIG. 20.

Methods DoSomething5 and DoSomething6, shown in FIG. 21., demonstrate implicit parameter declaration as a part of method call statement-expression[7]. Methods DoSomething5 and DoSomething6 can be rewritten by using parameters declared in the method head part as shown in FIG. 22.

[7] If syntactic form does not return value or syntactic form returns value and returned value is not used, then method call is interpreted as a statement; otherwise method call is interpreted as an expression.

Similarly, it is possible to declare implicit parameters as expressions of other statements (if statement; switch statement; while statement; for statement; and other statements, which accept expression as a part of its declaration syntax). It is possible to declare implicit parameters as expressions of some complex expressions as well (part of binary expression; part of assignment expression; part of unary expression, and part of other expressions, which accept expression as a part of its declaration syntax).

In many of the general purpose programming languages every action is performed in methods. Program entry point also is a method. Implicit parameter usage in program entry point method will lead to the compilation errors, because it would change method signature. However, the most important point is that the implicit parameters concept is consistent (similar in all methods).

Anonymous Implicit Parameters

Sometimes method parameters in the method body are used only once and they do not have to be used repeatedly. In such cases it would be useful to have anonymous implicit parameters, which can be declared instead of some expression, using the following syntactic form:

ParameterType where ParameterType specifies type of anonymous implicit parameter, but name of anonymous implicit parameter is not specified. It will be generated automatically by compiler. Example of anonymous implicit parameter (method DoMethod7) is shown in FIG. 23. Method DoSomething7 can be rewritten by using parameters declared in the method head part as shown in FIG. 24.

Method DoSomething8 (shown in FIG. 25.) demonstrates usage of many anonymous implicit parameters. Method DoSomething8 can be rewritten by using parameters declared in the method head part as shown in FIG. 26.

The example of methods DoSomething9 and DoSomething10 shown in FIG. 27. demonstrates anonymous implicit parameter declaration as a part of method call expression. Methods DoSomething9 and DoSomething10 can be rewritten by using parameters declared in the method head part as shown in FIG. 28.

There are several cases, when type has different predefined meaning and it should not be interpreted as an anonymous method parameter, when used in the method body:
  (a) in relational expressions using 'is' operator:
     var thisIsFalse=6 is string;
  (b) in relational expressions using 'as' operator:
     var thisIsObject=6 as object;
  (c) in typeof-expressions using 'typed' operator:
     var myType=typeof(int);
  (d) in cast-expressions:
     var myObject=(object)string.Empty;
  (e) in object-creation-expressions:
     var thisIsNewObject=new object( );
  (f) other cases or even some future modifications are theoretically possible.

However, in all 6 mentioned cases type is used as a final value and syntax does not allow supplying an expression instead. In all other cases, when type is used in place of some expression, it should be clearly interpreted as an anonymous implicit parameter.

Canonical Form of Implicit Parameter Declaration

In most cases, when defining implicit parameters, their types could be detected from the usage context. In such cases implicit parameter declaration syntax can be improved by removing type declaration part from implicit parameter declaration syntax. This shortened syntax is called canonical form of implicit parameter declaration syntax and its declaration, in place of some expression, is the following:
parameterName;
where parameterName specifies name of the parameter and type of the parameter will be inferred from its usage context.

Valid example of implicit parameter declaration in method DoSomething11 by using canonical declaration form in assignment statement-expression is shown in FIG. 29., which can be rewritten by using parameters declared in the method head part as demonstrated in FIG. 30.

Invalid example, where type of variable x cannot be detected from usage context, is shown in FIG. 31.

The method DoSomething13 shown in FIG. 32. demonstrates canonical form of implicit parameter declaration as a part of method call statement-expression. Method DoSomething13 can be rewritten by using parameters declared in the method head part as shown in FIG. 33.

Canonical form of implicit parameters declaration forces all unknown identifiers located in the method body to be interpreted as implicit method parameters. This is logical and consistent (equal in all methods, even in program entry point). It solves problem of how to interpret unknown identifiers and what to do with them instead of throwing compile time errors.

Implicit Parameters with Parameter Modifiers

Similarly as implicit parameters (parameters passed by value), parameters passed by reference can be declared implicitly (in the method body). To do it, parameter modifier 'ref' should be used in the following syntactic form instead of some expression:
ref type identifier
where 'type' specifies type of the parameter and 'identifier' specifies name of the parameter.

Ref parameter can be used in canonical implicit parameter syntactic form:
ref identifier
where parameter type will be inferred from usage context.

Ref parameter also can be used in anonymous implicit parameter syntactic form:
ref type
where parameter name will be auto-generated by compiler.

Example of method DoSomething14 with implicitly defined parameter in canonical form passed by reference (used together with assignment statement-expression) is shown in FIG. 34. Method DoSomething14 can be rewritten by using parameters declared in the method head part as shown in FIG. 35.

Output parameters can be declared implicitly (in method body) by using keyword 'out' restricted by the following syntactic form:
out type identifier=expression;
where 'type' specifies type of parameter, 'identifier' specifies name of parameter and 'expression' is value or expression returning some value.

Out parameter can be used in canonical implicit parameter syntactic form:
out identifier=expression;
where parameter type will be inferred from usage context.

Out parameter also can be used in anonymous implicit parameter syntactic form:
out type
where parameter name will be auto-generated by compiler.

Example of method DoSomething15 with implicitly defined output parameter in canonical form is shown in FIG. 36. Method DoSomething15 can be rewritten by using parameters declared in the method head part as demonstrated in FIG. 37.

Method DoSomething16 (shown in FIG. 38) demonstrates invalid example of method declaration containing output parameter, because value is not assigned to output parameter.

Implicit output parameter syntax is preferable, because it does not need additional context information to figure out if value is assigned to output parameter within method body or not. If implicit output parameter is defined, then by definition it is also assigned to some value and the both together contributes to the improvement of code readability.

Implicit Parameter Order in List of Method Parameters

First declared implicit parameter goes first in list of method parameters, but sometimes method parameters have to be in different order than required by algorithm declared in the method body. This situation is illustrated in method PrintName example using parameters declared in the method head part as shown in FIG. 39.

Implicit parameter order in list of method parameters can be changed by using any statement, for example, method DoNothingWith (shown in FIG. 40., which accepts parameter, but does nothing with it) can be used to improve method PrintName declaration (FIG. 40).

This way it is possible to make method PrintName to accept two parameters so, that first is firstName and second—lastName and the printing algorithm remains unchanged.

However, the problem is that the method DoNothingWith is useless from the business logic perspective and in the optimisation phase (performed by compiler, see FIG. 41.) it should be removed from program. Better approach would be to create special operator named "place" which would act like method DoNothingWith. The operator "place" allows placing implicit parameters (defined as operator "place" argument expressions) into list of method (where the operator "place" is used) parameters without adding extra functional program logic to abstract syntax tree. The main benefit of operator "place" is that it can be standard, predefined way to define parameters in one order and process them in different order without adding extra program logic items to the abstract syntax tree. This way it is possible to process operator "place" in parsing phase reducing the need to be optimized in optimization phase.

Operator "place" is used as statement in following syntactic form:
place(listOfParameters);
Where listOfParameters is nonempty list containing comma separated implicit parameters and parameter declaration syntax is following:
type identifier
Where 'type' specifies type of the parameter and 'identifier' specifies name of the parameter.

Method PrintName can be improved by using operator "place" as shown in FIG. 42.

There are some specific cases, when it is not possible to implement feature using implicit parameters without operator "place". One of such cases is anonymous recursion, but mostly is will be possible to achieve the desired result with implicit parameters and without using operator "place".

Implicit Arguments

It is possible to omit optional arguments in method calls, but that cannot be done with the required arguments. Optional arguments require method parameters to be declared with assignment of default values. This means that if you want to use optional arguments, you should know it, when defining method and its parameters and you should have permissions to change declaration of method you want to call. Problem can be solved by inventing implicit arguments.

If method required arguments are omitted, then omitted arguments are automatically added as method signature parameters to method, from which the call is done. Example (methods: DoSomething17, DoSomething18, DoSomething19) is demonstrated in FIG. 43.

Example of calling method DoSomething17 is following:
DoSomething17(6, 36);
Methods DoSomething17, DoSomething18 and DoSomething19 can be rewritten without using implicit parameters and implicit arguments as follows shown in FIG. 44.

Parameter names of method DoSomething19 differ from parameter names of DoSomething18 and DoSomething17. DoSomething18 call syntax inside DoSomething19 declaration still can be improved if we change DoSomething19 parameter names paramA and paramB, using the names param1 and param2 instead as demonstrated in FIG. 45 (using methods DoSomething20, DoSomething21 and DoSomething22).

Method DoSomething22 declaration is equivalent to example using implicit arguments in DoSomething21 call and implicit parameters in DoSomething22 declaration as shown in FIG. 46. Methods DoSomething20, DoSomething21 and DoSomething22 can be rewritten without using implicit parameters and implicit arguments as demonstrated in FIG. 47.

Using implicit arguments parameter names becomes part of API and in some cases it can lead to errors or undesired results. Consider the example of methods DoSomething23, DoSomething24 and DoSomething25 as shown in FIG. 48. Method DoSomething25 will have 3 implicit parameters; two of them being with the same name 'param2' but with different types. Such situation is not acceptable. Methods DoSomething23, DoSomething24 and DoSomething25 can be rewritten without using implicit parameters and implicit arguments as demonstrated in FIG. 49. Implicit argument naming conflict can be resolved by using different implicit parameters and rewriting method DoSomething25 as shown in FIG. 50. Method DoSomething25 can be rewritten without using implicit parameters as demonstrated in FIG. 51.

Implicit Arguments Together with Method Parameter Modifiers

Method parameter modifiers can be used together with the idea of implicit arguments if method parameter modifier is required in the method declaration. Examples of such method parameter modifiers are: ref (for reference parameters), out (for output parameters), params (for method parameter that takes a variable number of arguments). Example of implicit argument passed by reference, implicit output argument and implicit argument with method parameter modifier 'params' are shown in FIG. 52. (method DoSomething26 demonstrates parameter declaration and method DoSomething27 demonstrates implicit argument usage). Method DoSomething27 can be rewritten without using implicit parameters as demonstrated in FIG. 53.

Generics Together with Implicit Parameters and Implicit Arguments

Implicit parameters and arguments can be used together with generics and they do not affect general idea of implicit parameters and arguments. Simple example (method DoSomething28) using generic implicit parameter is shown in FIG. 54. Method DoSomething28 can be rewritten by using parameters declared in the method head part as demonstrated in FIG. 55. Method DoSomething28 execution examples are provided in FIG. 56.

In a similar way, generics can be used in method chains together with implicit parameters and implicit arguments as shown in FIG. 57., where methods DoSomething29, DoSomething30 and DoSomething31 are provided. Methods DoSomething29, DoSomething30 and DoSomething31 can be rewritten without using implicit parameters and arguments as shown in FIG. 58.

Implicit Parameters and Arguments in any Concept that can be Interpreted as Method Implicit parameters and arguments can be used in any concept which can be interpreted as method, for example: rule, query, and other concepts, even if they are used in different logics, for example, rule in predicate logics. This means that implicit parameters and arguments can be used not only in logics working with equality concept, but also in logics working with fewer strong forms than equality, for example: implication, "is implied by" operation and even with "not yet known" forms:
1) "implication", example $a \Rightarrow b$
2) "is implied by", example: $a \Leftarrow b$
3) "some future operator form", example: a someOperator b

Example of Data Querying Language Based on Prolog without Using Implicit Parameters and Arguments Invoice (has properties Warehouse, DealDate, . . . ) and Warehouse are user defined types, but DateTime is system type representing date. Comma in rule definitions represents AND operator, semicolon represents end of statement, symbol ':-' represents operator 'is implied by', and symbols '=', '>=' and '<' represent comparison operators, which act as constraint builders for meta-sets. Meta-sets are abstractions of object sets, they should be interpreted as small queries which together form larger queries. Meta-sets (meta-set variables) are needed for the unification process to work correctly, so meta-sets should not be treated as implicit parameters or arguments (they are always required; theoretically they could be made implicit, but it would hurt code readability). When meta-set is used in scope of rule (method), real name of meta-set variable will be declared name of meta-set variable+randomly generated part (this process is done in background by parser and real name of meta-sets used in each rule is not known to programmer).

For example, the code shown in FIG. 59., could be interpreted by parser in a way demonstrated in FIG. 60. This way it is possible to achieve concise syntax and, most important, to create a ground for unification to work correctly. The idea of implicit parameters and arguments is independent from the unification. For this reason this article does not cover meta-set unification in details.

Syntactic form: someVariable.SomeProperty is used to access property SomeProperty of specified object someVariable. Language semantics can be viewed as process of query building. Logic programming engine works with abstractions of object sets (combining together different meta-sets with different constraints), so the result of the process will be meta-set (abstraction), but from the meta-set query to database can be generated to retrieve real objects. Query declarations are needed to generate code from our language in any general purpose programming language.

Example in data querying language based on Prolog without using implicit parameters and arguments are provided in FIG. 61. The code uses global variables, which makes this code difficult to use in parallel systems. Besides, parameter (global variable) names and types are used in too many places. Code redundancy is a real problem in the domain specific languages, where languages consist of concepts which can be interpreted as methods. Usually these concepts contain lot of parts that can be interpreted as method parameters.

Example of Data Querying Language Based on Prolog Using Implicit Parameters and Arguments Example in data querying language based on Prolog using implicit parameters and arguments is provided in FIG. 62. This approach allows thinking in terms of rules (more declarative approach) instead of method declaration and execution. At the same time, it preserves all benefits that can be gained, when rules are interpreted as methods.

In the above mentioned code example only canonical form of implicit parameters is used. Other forms of implicit parameters would be the same as described in the chapters introducing implicit parameters and arguments.

What is claimed is:

1. A method executed by a processor for facilitating declaration of a function or a method in programming languages using one or more implicitly declared parameters in full form, comprising:
   obtaining the implicitly declared function or method parameters as expressions declared in a function or method body, where each implicit parameter expression consists of a parameter name and a parameter type information;
   adding the implicitly declared parameters to a function or method parameters list;
   ordering the parameters in the function or method parameters list so, that first comes the explicitly declared parameters if there are any and then comes the implicit parameters in the same order they are declared in the method or function body.

2. The method of claim 1 wherein the implicitly declared parameters can be passed by value.

3. The method of claim 1 wherein the implicitly declared parameters can be passed by reference.

4. The method of claim 1 wherein the implicitly declared parameters can be output parameters.

5. A method executed by a processor for facilitating declaration of a function or a method in programming languages using one or more implicitly declared parameters used in canonical form, comprising:
   obtaining implicitly declared function or method parameters as expressions declared in a function or method body, where each implicit parameter expression consists of parameter name information;
   automatically detecting the parameter type information from the implicit parameter expression by using type inference mechanism;
   adding the implicitly declared parameters to a function or method parameters list;
   ordering the parameters in the function or method parameters list so, that first comes the explicitly declared parameters if there are any and then comes the implicit parameters in the same order they are declared in the method or function body;
   resulting in each unknown identifier used in the function or method body to be interpreted as the function or method parameter declared in canonical form.

6. The method of claim 5 wherein the implicitly declared parameters can be passed by value.

7. The method of claim 5 wherein the implicitly declared parameters can be passed by reference.

8. The method of claim 5 wherein the implicitly declared parameters can be output parameters.

9. A method executed by a processor for facilitating declaration of a function or a method in programming languages using one or more implicitly declared parameters used in canonical form, comprising:
   obtaining the implicitly declared function or method parameters as expressions declared in a function or method body, where each implicit parameter expression consists of a parameter type information;
   automatically generating unique name for each implicitly declared parameter;
   adding the implicitly declared parameters to a function or method parameters list;
   ordering the parameters in the function or method parameters list so, that first comes the explicitly declared parameters if there are any and then comes the implicit parameters in the same order they are declared in the method or function body.

10. The method of claim 9 wherein the implicitly declared parameters can be passed by value.

11. The method of claim 9 wherein the implicitly declared parameters can be passed by reference.

12. The method of claim 9 wherein the implicitly declared parameters can be output parameters.

13. A method executed by a processor for facilitating use of the function or method calls in programming languages using one or more implicit arguments, comprising:
- omitting one or more arguments in the method or function call;
- adding each omitted argument to the parameters list of a caller method or function (in which body the previously mentioned function or method call is performed) as implicitly declared parameter.

14. The method of claim 13 wherein the implicit arguments can be passed by value.

15. The method of claim 13 wherein the implicit arguments can be passed by reference.

16. The method of claim 13 wherein the implicit arguments can be used as output parameters.

17. The method of claim 13 wherein the method parameter that takes a variable number of arguments is used, comprising:
- creation of a temporary array for holding the method parameters;
- putting the arguments, which are passed to the method, into the temporary array;
- using the temporary array in the method body to process the parameters;
- constraining a type of the arguments passed to the method call to be compatible with a type of the temporary array items, and the method parameter which takes a variable number of arguments, is declared as the last parameter of the method.

18. A method executed by a processor for facilitating declaration of a function or a method in programming languages using one or more implicitly declared parameters in full form, comprising:
- obtaining the implicitly declared function or method parameters as expressions declared in a function or method body in full form (containing a parameter name and a type), canonical form (containing a parameter name, where a type is inferred automatically) or anonymous form (containing a parameter type, where unique parameter name is generated automatically);
- adding the implicitly declared parameters to a function or method parameters list;
- ordering parameters in a function or method parameters list so, that:
  - first come the explicitly declared parameters, if there are any;
  - then come the implicit parameters with a special operator 'place' applied in the same order they are declared in the method or function body;
  - then come the implicit parameters without the operator 'place' applied in the same order they are declared in the method or function body;
- parameter occurrences with operator 'place' applied in the method body are ignored from the parameter usage perspective.

* * * * *